United States Patent [19]

Andriulis

[11] 3,768,312

[45] Oct. 30, 1973

[54] VACUUM GAUGE
[75] Inventor: Vytautas Andriulis, Chicago, Ill.
[73] Assignee: Cenco Incorporated, Chicago, Ill.
[22] Filed: Jan. 12, 1972
[21] Appl. No.: 217,375

[52] U.S. Cl. ............................................... 73/400
[51] Int. Cl. ......................................... G01l 21/04
[58] Field of Search ............................. 73/400, 388

[56] References Cited
UNITED STATES PATENTS
3,112,650   9/1972   Nester.................................. 73/400

OTHER PUBLICATIONS

Florescu, "Compact Oil McLeod Gauge," University of Technology, Sydney, Australia, Notes–page 529, Feb. 24, 1958.

Primary Examiner—Donald O. Woodiel
Attorney—Robert E. Wagner

[57] ABSTRACT

An apparatus for the precise measurement of pressures in vacuum systems including a closed and sealed container means in communication at its upper end with such a system and having disposed for vertical movement within it a plunger means having a hollow lower portion of either spherical bulb shape or bell shape and an upper portion having a reference capillary and a measuring capillary opening into the interior of the lower portion of the plunger means at their lower ends. The gauge operates by moving the plunger means downward into a bottom portion of the container shaped correspondingly to the lower portion of the plunger means which holds a limited quantity of mercury disposed below an oil bath. The bell or bulb-shaped lower portion of the plunger means is lowered into the oil bath until it contacts the mercury, at which time the mercury acts as a piston to push the oil up into the capillaries until the zero level of the reference capillary is reached, at which point the measuring capillary may be read to obtain the system pressure.

18 Claims, 4 Drawing Figures

PATENTED OCT 30 1973

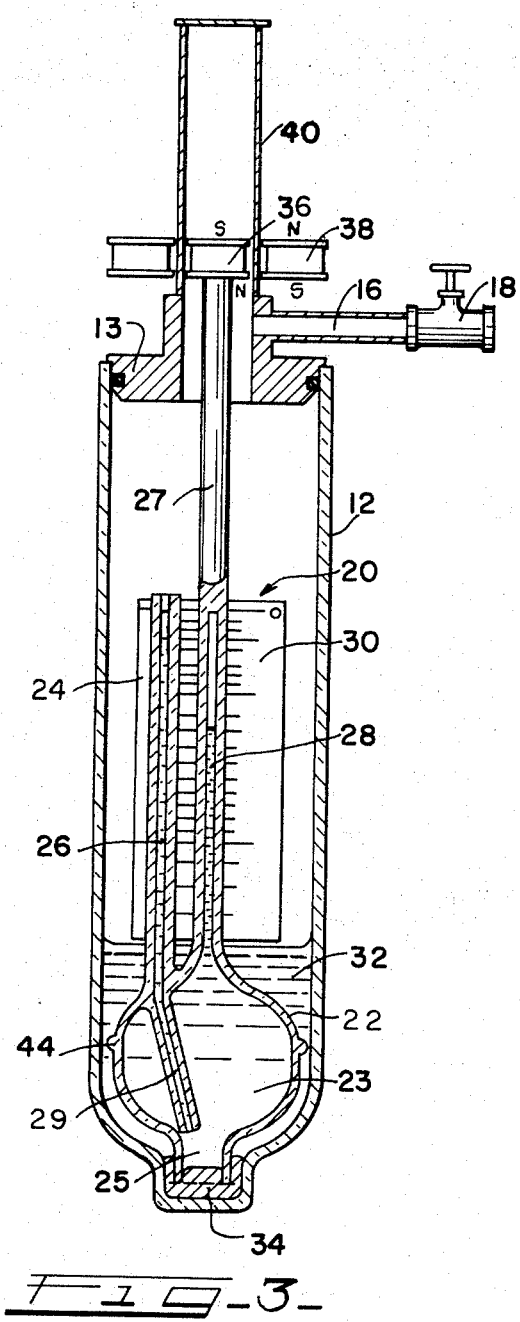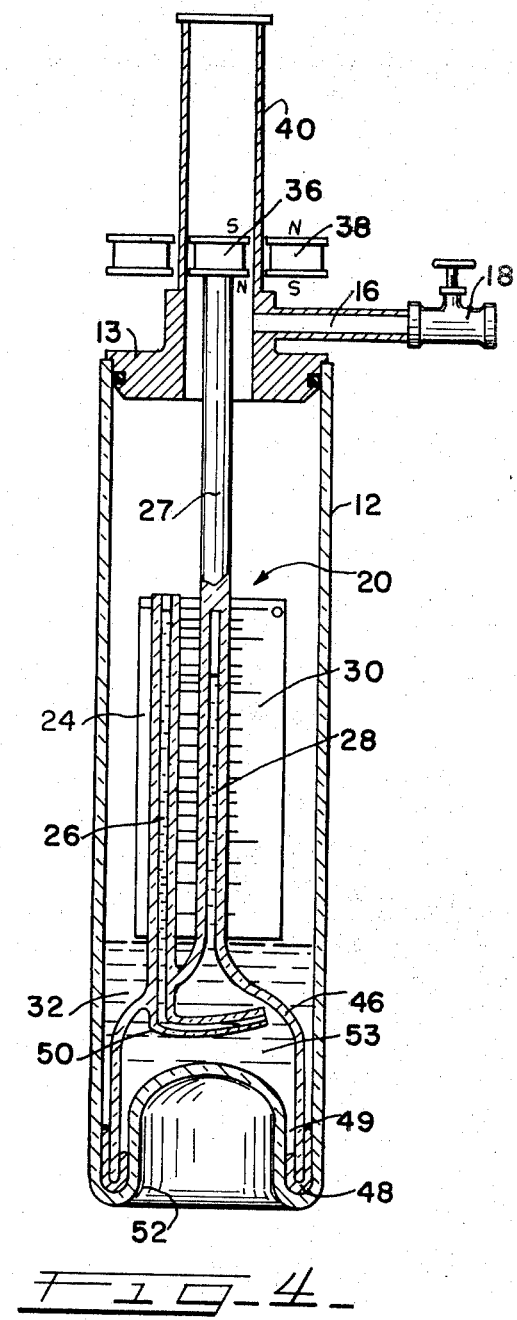

VACUUM GAUGE

BACKGROUND OF THE INVENTION

This invention relates to an apparatus particularly adapted for use as a gauge in the precise measurement of pressures in low pressure or vacuum systems.

The measurement of pressures or changes in pressure in vacuum systems has long posed a problem to educational, research and industrial laboratories using and dealing with the use of such systems in their work. In the past, such pressures have usually been measured by the use of one of two types of gauges, depending on the type of system and the accuracy desired. The first of these gauges is called the Dubrovin gauge. This gauge is a type of manometer, which consists of a glass cylinder partly filled with mercury, having a stainless steel tube closed at the upper end and open at the bottom closed within it and floating vertically in the mercury. In operation, the gauge and steel tube must be evacuated so that the residual pressure throughout the gauge and the tube is very low. The gas of the pressure system to be measured is then admitted through the top of the gauge and pushes the steel tube down more deeply into the mercury. A balance is reached, at the pressure of the system, when the weight of the tube plus the force exerted on its closed end is equal to the change in the weight of the displaced mercury. For such a gauge, a resulting change in the length of the steel tube protruding above the mercury of one centimeter represents a change in pressure of 1 torr so that a pressure change of 0.1 torr can be detected.

The second type of gauge, called the McLeod gauge, combines a liquid manometer with a means of compressing a sample of gas and thereby extends the range over which the pressure of the system can be measured considerably below the limits of the Dubrovin gauge. The typical McLeod gauge includes a glass bulb with a capillary tube extension on the top having a side arm connected to the vacuum system and a means of raising and lowering the liquid level within the gauge. When the mercury level is lowered, the bulb traps gas from the system. After this, the mercury level is raised, cutting off the bulb from the side arm and compressing the sample of gas into one of the capillaries. The difference in the level of the mercury in the bulb capillary and side arm capillary connected to the system is due to the pressure difference resulting from compression of the sample. Knowing the difference in the height of the mercury in the two capillaries and the volume of the bulb, then the pressure in the system may be computed. The McLeod gauge provides a great degree of sensitivity for vacuum measurements and is frequently used as a standard gauge for calibrating most other types of low pressure gauges.

Both gauges, however, have distinct disadvantages. Those of the Dubrovin gauge are obvious in that the entire gauge must be physically moved or tilted before each use, it requires a large quantity of mercury and is not sensitive to pressure changes below 0.1 torr. The McLeod gauge, while being extremely sensitive to the constant pressure and pressure changes, is inherently a cumbersome instrument to use in the pressure range of from $10^{-3}$ to $10^{-6}$ torr in which it is most needed and does not permit frequent readings. In addition, since it must be made at least partly of glass, it is a fragile device in which the shifting mercury level must be carefully supported to avoid disaster and breakage. The interior of the McLeod gauge and the mercury used must be entirely clean and particularly free of oil and grease to prevent the mercury from sticking in the capillary or refusing to come down when the level is lowered. Even where oil is a measuring fluid, the capillary tubing used in the conventional McLeod gauge creates problems in the operation and performance of the gauge because the oil has a tendency to stick in the capillary at the point where the capillary joins the bulb. This necessitates the use of a capillary heating apparatus to free the fluid. In addition, the connecting tubing for a portable McLeod gauge is a source of error since it must be long but of small diameter. The difficult manufacture of a McLeod gauge also requires forming an integrally-shaped volume and connected side arm tubing and capillary tubing. Furthermore, the McLeod gauge usually requires, depending upon its size, elaborate methods of smoothly raising and lowering the mercury media, since great care must be exercised in using mercury.

An attempt to solve the problems of at least the Dubrovin gauge has been set forth by G. R. Abell, Jr. in U.S. Pat. No. 2,458,759 which teaches a gauge for measuring sub-atmospheric pressures including a closed container partly filled with a liquid and connected to a system whose pressure is to be measured, an entrapment cup floating in the liquid and a magnetic means for moving the cup within the container. This invention obtains entrapment of the gas of the pressure system not by movement of liquid but by the movement of the entrapment cup itself which is lifted above the liquid and returned to it. The weight of the cup minus the weight of the displaced liquid then forms the pressure applied to the entrapped gas volume which is the pressure in the system. Abell, Jr. teaches the entrapment cup floating in a single liquid and being moved to entrap gas volume.

The basic disadvantage with Abell's modified Dubrovin gauge is that it does not compensate for variations in temperature. The densities of the floating media, cylinder, and gas all not only vary with temperature, but also change relative to one another so that a small variation in temperature results in a variation in the reading which yields a linear error. Further, such variation in Abell, as in Dubrovin, precludes the possible establishment of a fixed or stable baseline or reference point where the pressure is zero, thereby rendering readings taken under even slightly varying physical conditions meaningless. Though the gauge is much less expensive to manufacture than a McLeod gauge, it is not nearly as accurate as a McLeod gauge and is only useful in systems with pressures greater than 0.1 torr.

Finally, the use of mercury as a measuring fluid in the McLeod gauge or in both the Dubrovin and Abell gauges is not only a hazard to the operator but also presents the danger of mercury contamination of the gas of the pressure system being measured.

DESCRIPTION OF THE INVENTION

The vacuum gauge of this invention overcomes the problems and disadvantages of the above attempts to accurately measure pressures in a vacuum system. This apparatus achieves a solution to these problems by a sealed container in communication at its upper end with a vacuum system through conduit means having a valve means disposed in the conduit means which surrounds and encloses a plunger means having a hollow spherical bulb or bell-shaped lower portion and having dual parallel capillary means extending upwardly as its upper portion and opening at their lower ends into the bulb or bell of the lower portion. The plunger means is movable vertically within the container means so that it may be raised above or lowered into a secondary fluid filling the bottom portion of the container means. Disposed below the secondary fluid in the container means is an amount of mercury, the quantity depending upon the configuration of the lower end of the container means which corresponds to the configuration of the lower portion of the plunger means. At the inception of the measurement operation, the bulb or bell of the plunger means which opens downward in a mouth is in position above the surface of the secondary liquid in the container means. When it is desired to measure the vacuum pressure in the system connected to the gauge, the plunger means is lowered so that the secondary fluid enters the mouth of the plunger means and effects a first compression of gas. When the mouth of the lower portion of the plunger means contacts the mercury, the second stage of gas compression begins wherein the mercury acts as a piston to raise the secondary fluid up into the capillaries above the level of the fluid outside the plunger means. The plunger means is maneuvered until the secondary fluid is at the zero level in the reference capillary. The measuring capillary may then be directly read to determine the pressure in the system.

One significant advantage provided by the apparatus of this invention is that the use of a reference capillary establishes a stable baseline or non-variable reference point which is not disturbed during measurement. Such a reference point establishes a common starting point for each measurement and constitutes a tremendous improvement over baseless or variable base systems (such as Abell and Dubrovin) where any "baseline" will vary with changes in temperature and/or pressure rendering the measurements made relatively meaningless.

Another advantage resulting from the use of the reference and measuring capillaries of the present invention is that the secondary fluid contained in these respective capillaries is always in equilibrium when the measurement reading is made thereby preventing errors resulting from unbalanced forces inherent in many prior art designs.

It is also very significant that the construction of the present invention drastically reduces the error due to the temperature variations present in prior art gauges such as Dubrovin and Abell. The apparatus of this invention is not a floating type gauge but is constructed so that the densities of its various elements cannot interact or change relative to one another due to temperature variations to cause inconsistent or inaccurate readings. With the use of this unique apparatus, change in temperature will only affect measurement minimally.

This invention permits a measurement reading on the pressure in the system to be obtained merely be raising and lowering the plunger means, which is a much faster operation than the tipping and draining required by the Dubrovin and oil McLeod gauges and involves a far easier operation than that required to raise the mercury level in a McLeod gauge. Thus, much more frequent measurements are possible than previously.

The vacuum gauge of this invention also uses only small quantities of mercury, covered by a secondary fluid, such as oil, which acts as the measuring fluid. Covering the mercury with oil in this manner substantially reduces contamination arising from the use of mercury in direct contact with the gas as in the prior art gauges. The limited amount of mercury used is also significant since it reduces weight problems and possible breakage and spillage hazards.

Not only is the density of the oil used as a secondary fluid and measuring fluid 15 times less than the density of mercury and much less expensive, but also the measuring capillary is uniquely constructed to open into the bulb or bell of the plunger means through a lower end of increasing internal diameter so that oil will not stick in the capillary.

As a result of these unique features, the vacuum gauge of this invention is much more accurate than the Dubrovin or improved Dubrovin gauges which can provide readings to approximately 0.1 torr. This gauge yields much more precise and accurate readings than are possible in either the Dubrovin or Abell type gauges. In fact, the precision and accuracy of the present invention is dependent upon and only limited by the standards of its construction and the desired precision of its construction.

In summary, the unique apparatus of this invention provides a gauge for measuring the pressure in vacuum systems which is compact, fast and easy to operate, provides a constant reference point for measurement, provides automatic compensation for temperature changes and thus reduces error, achieves great accuracy in its measurements and eliminates mercury contamination of the system to be measured.

Accordingly, it is an object of this invention to provide an apparatus for measuring pressures in vacuum systems which provides a non-variable reference point on which all measurements are based.

It is a further object of this invention to provide an apparatus for measuring pressures in vacuum systems in which the measuring fluid is an equilibrium during measurements.

It is another object of this invention to provide an apparatus for measuring pressures in vacuum systems which provides accurate and correct measurements despite variations in temperature and pressure.

It is also an object of this invention to provide an apparatus for measuring pressures in vacuum systems which permits fast, easy and frequent measurement of such pressures.

It is still another object of this invention to provide an apparatus for measuring pressures in vacuum systems which reduces hazards of mercury contamination and glass breakage by covering the limited amount of mercury used with a secondary measuring fluid.

It is a further object of this invention to provide an apparatus for measuring pressures in vacuum systems which uses a low specific gravity fluid as the measuring agent.

It is another object of this invention to provide an apparatus for measuring pressures in vacuum systems which is inexpensive to manufacture.

It is still another object of this invention to provide an apparatus for measuring pressures in vacuum systems which provides for a wide range of measurement and great accuracy of measurement.

It is one other object of this invention to provide an apparatus for measuring pressures in vacuum systems which is light in weight and easily transportable.

These and other important objects of this invention will become apparent from the following description taken in conjunction with the drawings illustrating preferred embodiments wherein:

FIG. 3 is a vertical cross-sectional view of the vacuum gauge shown in FIG. 2 with the plunger means in lowered position for measuring; and, FIG. 4 is a vertical cross-sectional view of the vacuum gauge of this invention having a plunger means with a bell-shaped lower portion in lowered position for measuring.

Figures 1, 2:
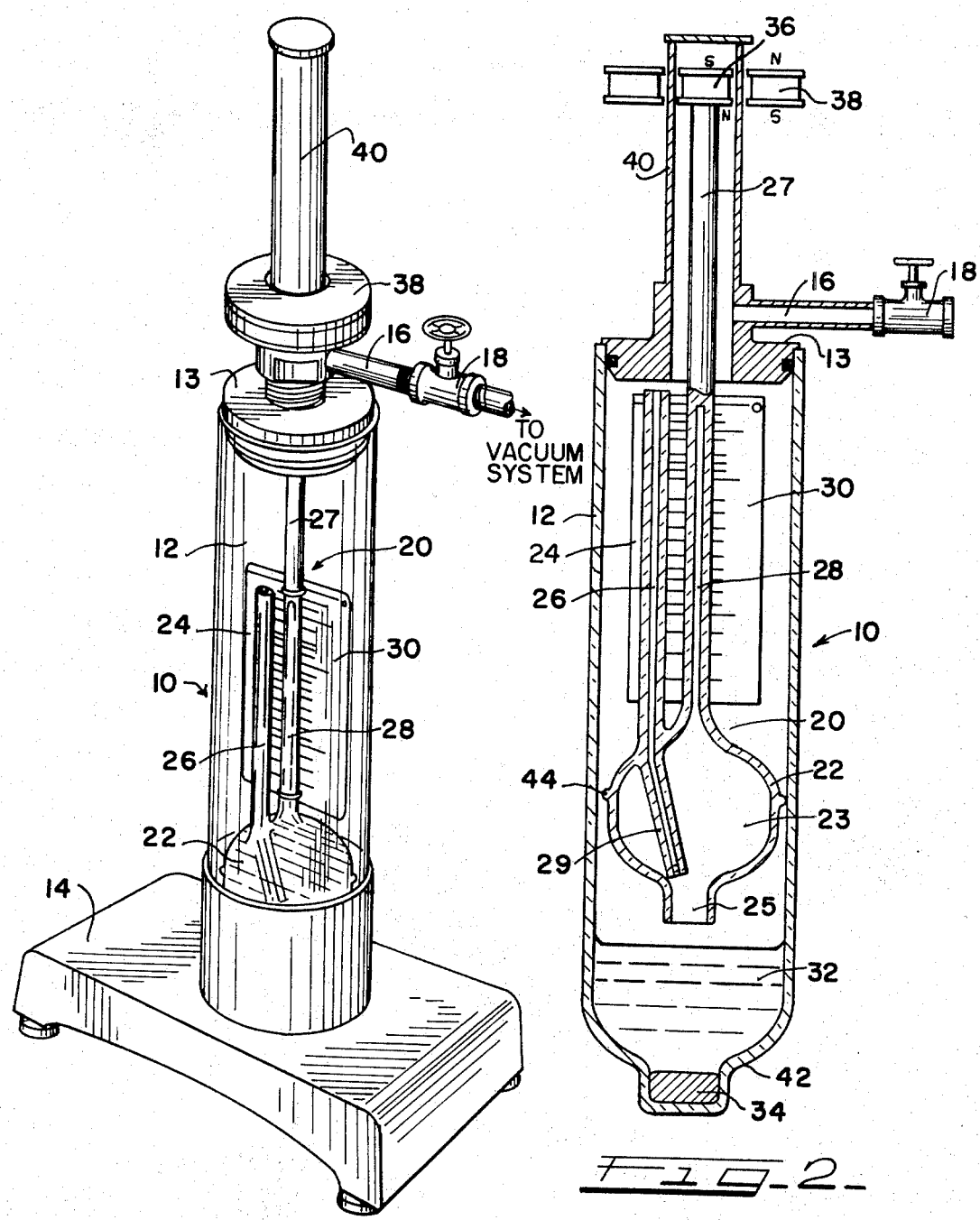
FIG. 1 is a perspective view of a vacuum gauge according to one embodiment of this invention.
FIG. 2 is a vertical cross-sectional view of the vacuum gauge of this invention having a plunger means with a bulb-shaped lower portion in raised position.

Referring now to the drawings and more particularly to FIG. 1, one embodiment of the vacuum gauge of this invention is shown at 10.

This vacuum gauge 10 includes a stand or base 14 which supports and maintains, in a vertical position, a container means 12 which is closed and sealed at both ends but which has a conduit means 16 disposed through a cap seal 13 at its upper end connecting it with a vacuum system (not shown). The closed and sealed container means 12 may be opened for communication to the vacuum system by means of a valve 18 disposed in the conduit means 16.

Container means 12 has, disposed for vertical movement within it, a plunger means 20 as shown in FIGS. 1 and 2. The plunger means 20 includes a bulb-shaped lower portion, as shown in FIGS. 1-3, defining a hollow interior 23 which opens to the interior of the container means 12 in a downwardly extending mouth 25. The upper portion 24 of the plunger means 20 includes an upwardly extending reference capillary 26 and a generally parallel upwardly extending measuring capillary 28 which is closed at its upper end. These capillaries 26 and 28 are formed from tubing having substantially the same internal bore throughout most of their length. They open at their bottom ends into the hollow interior 23 of the bulb-shaped lower portion 22 of the plunger means 20. The reference capillary 26 has an extension 29 which extends downwardly through the interior 23 of the bulb-shaped lower portion 22 of plunger means 20 toward the mouth 25. The measuring capillary 28 is disposed generally along the central axis of the container 12 and extends the length of the container 12, having attached or formed to it at its upper end a shaft 27 to assist in moving the plunger means 20 within the container means 12. The internal diameter or bore of the measuring capillary 28 is purposely gradually increased from the lower end to the mouth of this capillary so that oil will not stick in the capillary 28 as in previous gauges and interfere with measurement.

Near the top portion of the shaft 27, is disposed a magnet 36 which moves freely within a small diameter plunger passageway 40, which extends through cap seal 13 in sealed relationship therewith. The interior magnet 36 disposed on the plunger shaft 27 is complemented by an annular exterior magnet 38 disposed about the outside circumference of plunger passageway 40 in such a position that the opposite poles of the magnets 36 and 38 are adjacent, as shown in FIGS. 2 and 3. Thus, exterior magnet 38 and interior magnet 36 create an attractive magnetic field between them so that as exterior magnet 38 is moved vertically along plunger passageway 40, interior magnet 36 and plunger means 20 attached thereto are likewise moved.

As shown in FIG. 2, plunger means 20 is disposed above a secondary fluid 32 contained in the lower portion of container 12. This secondary fluid 32 is, in turn, disposed above a primary fluid, e.g., a small quantity of mercury 34. This mercury 34 fills the lower end 42 of container 12 which has been formed corresponding to the bulb shape of the lower portion 22 of plunger means 20.

When it is desired to measure the pressure of the vacuum system, the valve 18 is opened to the system so that the pressure in the system is communicated through conduit 16 to container 12. Exterior magnet 38 is then moved in a downward direction along the outside of plunger passageway 40, thereby moving interior magnet 36 and the attached plunger shaft 27 the same distance downwardly so that the entire plunger means 20 is moved in the direction of the secondary fluid 32. The plunger means 20 is guided in its downward movement so that it remains substantially vertical by knobs 44 disposed around the circumference of lower portion 22 of plunger means 20 as shown in FIG. 2.

When the bulb-shaped lower portion 22 of plunger means 20 reaches secondary fluid 32, this fluid 32 enters the hollow interior 23 of bulb-shaped portion 22 through mouth 25 to begin the first compression of the gas whose pressure is to be measured. When the fluid 32 enters the reference capillary extension 29, the gas inside the plunger bulb 22 is effectively separated from the vacuum system. As plunger means 20 continues to be moved in a downward direction, the mouth 25 of the lower portion 22 of plunger means 20 reaches the pool of mercury 34 and contacts it and the mercury 34 moves into the mouth 25 and around the outside circumference of the mouth 25 as shown in FIG. 3. The mercury 34 acts as a piston to push the fluid 32 into the capillaries 26 and 28 above the level of fluid 32 outside the plunger and begin the second stage of compression of the gas.

When the level of fluid 32 in reference capillary 26 is established at the zero line marked on the calibrated measuring gauge 30 attached to plunger means 20, the fluid level in the measuring capillary 28 is at a point which indicates the pressure in the vacuum system as read directly from the measuring gauge 30.

When plunger means 20 is moved upwardly so that the mouth 25 of the lower portion 22 is withdrawn from the secondary fluid 32, a drop of secondary fluid 32 will remain blocking the opening to reference capillary 26, held there by surface tension, so that reference capillary 26 does not communicate the pressure trapped in the bulb 22, which is to be measured, to any subsequent pressure developed by the vacuum system.

After the level of fluid 32 in reference capillary 26 is brought to the zero level, a true reading of the pressure in the vacuum system is obtained since, at zero, the secondary fluid 32 in the reference capillary 26 is in equilibrium with the secondary fluid 32 in the measuring capillary 28 and a constant, non-variable reference point is established on which the measurement is based. Accurate readings are assured since each measurement is based upon the same reference point.

FIG. 4 shows a second possible embodiment of this invention which is exactly the same in principle yet is slightly different in structure. This embodiment uses a slightly larger quantity of mercury 48 and a container means 12 which is of different configuration at its lower end 52. In this embodiment, the lower portion 46 of the plunger means 20 is formed in a bell shape, having a mouth 49. Another change is that the extension 50 of the reference capillary 26 is bent at a right angle to the central axis of the container 12 so that it extends across the interior 53 of the lower portion 46 and slightly upwardly. This bend insures that a small amount of the secondary fluid 32 will remain in the reference capillary 26 when the plunger means 20 is raised above the level of the secondary fluid 32, thereby closing the reference capillary 26 to the interior 53 of the lower portion 46 to prevent communication between the interior 53 of this bell-shaped portion 46 and the vacuum system during measurement. In this embodiment, the lower end 52 of container 12 is formed in a shape corresponding to the bell-shaped lower portion 46 of plunger means 20. Thus, the center of the bottom of the lower end 52 of the container 12 protrudes upwardly into the interior 53 lower portion 46. The mercury 48 is disposed about this protrusion between the interior walls of container 12 as shown in FIG. 4.

In the operation of this embodiment, the plunger means 20 is lowered into the secondary fluid 32 which enters into the hollow interior 53 of lower portion 46 and separates it from the vacuum system. When the edges of the mouth 49 of the bell-shaped portion 46 come into contact with the mercury 48, the mercury 48 acts as a piston to push fluid 32 up into the capillaries 26 and 28 and to effect the second compression of the gas to be measured into capillary 28. When the reference capillary 26 reads zero, the system pressure may be read from the measuring capillary 28 and gauge 30.

The container means 12 may be constructed of any suitable material which is easily formed, impermeable and has sufficient strength to withstand atmospheric pressure, such as glass or plastic.

The plunger means 20 may be formed of any suitable material which is easily formed, transparent, light in weight, impervious and substantially nonmagnetic, such as glass or plastic. The capillaries 26 and 28 must be capable of being formed with substantial precision to approximately the same diameter except at their lower ends.

The secondary fluid 32 may be any suitable liquid having a lower density than mercury and a viscosity which will not tend to create flow problems within the capillaries 26 and 28. Such a liquid could be dibutyl sebacate which has been previously used in McLeod gauges.

The primary fluid used is preferably mercury in a quantity which will vary depending on the embodiment used. For example, in the preferred embodiment shown in FIGS. 1-3, only 3 or 4 cubic centimeters are necessary, whereas in the embodiment shown in FIG. 4, approximately ten cubic centimeters are required.

While the invention has been discussed in relation to preferred embodiments thereof, it will be apparent to those skilled in the art that the structural details are capable of wide variation without departing from the principles of the invention.

I claim:

1. An apparatus particularly adapted for the precise measurement of pressures in vacuum systems including container means closed and sealed at its opposite ends, said container means in communication at its upper end with a vacuum system, said container means containing, at its lower end, a quantity of primary liquid disposed below a quantity of secondary liquid, said secondary liquid having a density less than the density of said primary liquid, plunger means surrounded and enclosed by said container means, said plunger means having capillary means extending upwardly in the upper portion thereof, said plunger means having a lower portion with a configuration similar to that of the lower end of said container means, said plunger means being movable vertically within said container means in such a manner that said plunger means may be moved toward the lower end of said container means, displacing said primary liquid contained in said lower end of said container means and thereby urging said secondary liquid contained in said container means into said capillary means to permit measurement of the pressure in the vacuum system.

2. The apparatus of claim 1 wherein said plunger means includes a substantially spherical hollow bulb having an open downwardly extending cylindrical mouth at its lower portion and first and second capillary means extending upwardly from said hollow bulb in its upper portion, said capillary means disposed substantially parallel to the sides of said container means above said hollow bulb, said first and second capillary means opening into the interior of said hollow bulb at their lower ends, said bulb being movable downwardly within said container means in such a manner that said cylindrical mouth of said bulb is insertable into a correspondingly shaped downwardly protruding portion of the lower end of said container means, said protruding portion containing said primary liquid, a volume of which is displaced by said downwardly moving mouth of said bulb in such a manner that said displaced volume of said primary liquid urges a volume of said secondary liquid contained in said container means into said capillary means at the upper portion of said plunger means.

3. The apparatus of claim 2 wherein said first capillary means is a reference capillary having a lower portion extending downwardly into the interior of said spherical bulb and generally directed toward said mouth of said bulb, and said second capillary means is a measuring capillary closed at its upper end and having a lower end opening into the interior of said bulb, said measuring capillary increasing in diameter through its lower end toward the interior of said bulb.

4. The apparatus of claim 1 wherein said plunger means includes a bell-shaped shell open at its lower end and having first and second capillary means extending upwardly from said bell-shaped shell in its upper portion, said capillary means disposed substantially parallel to the sides of said container means above said shell, said first and second capillary means opening into the interior of said shell at their lower ends, said shell movable downwardly within said container means in such a manner that said open lower end of said shell and the body of said shell are insertable over a correspondingly-shaped portion of the lower end of said container means which protrudes upwardly into said container means, said downwardly moving shell displacing a volume of said primary liquid contained in said lower end of said container means in such a manner that said displaced volume of said primary liquid urges a volume of said secondary liquid contained in said container means into said capillary means at the upper portion of said plunger means.

5. The apparatus of claim 4 wherein said first capillary means is a reference capillary having a lower portion extending into the interior of said bell-shaped shell and directed substantially transversely to the central axis thereof, and said second capillary means is a measuring capillary closed at its upper end and having a lower end opening into the interior of said shell, said measuring capillary increasing in diameter through its lower end toward the interior of said shell.

6. The apparatus of claim 1 wherein said primary liquid contained in said container means is mercury and said secondary liquid contained in said container is a liquid having a low density.

7. The apparatus of claim 1 wherein said plunger means is movable vertically within said container means by magnetically coupled means disposed near the upper portion of said plunger means on the interior and exterior of said container means.

8. In an apparatus particularly adapted for the precise measurement of pressures in vacuum systems and including container means closed and sealed at its opposite ends, said container means in communication at its upper end with a vacuum system through conduit means, the improvement comprising, plunger means surrounded and enclosed by said container means and movable vertically within said container means, said plunger means having capillary means extending upwardly from an upper portion of said plunger means, said plunger means having a lower portion with a configuration similar to that of a lower end of said container means, said plunger means being movable toward the lower end of said container means to displace a primary liquid contained in the lower end of said container means, said primary liquid so displaced urging a less dense secondary liquid contained in said container means and disposed above said primary liquid into said capillary means to permit measurement of the pressure in said vacuum system.

9. The improvement set forth in claim 8 wherein said plunger means includes a substantially spherical hollow bulb having an open downwardly extending cylindrical mouth at its lower portion and first and second capillary means extending upwardly from said hollow bulb in its upper portion, said capillary means disposed substantially parallel to the sides of said container means above said hollow bulb, said first and second capillary means opening into the interior of said hollow bulb at their lower ends, said bulb being movable downwardly within said container means in such a manner that said cylindrical mouth of said bulb is insertable into a correspondingly-shaped downwardly protruding portion of the lower end of said container means, said protruding portion containing said primary liquid, a volume of which is displaced by said downwardly moving mouth of said bulb in such a manner that said displaced volume of said primary liquid urges a volume of said secondary liquid contained in said container means into said capillary means at the upper portion of said plunger means.

10. The improvement set forth in claim 9 wherein said first capillary means is a reference capillary having a lower portion extending downwardly into the interior of said spherical bulb and generally directed toward said mouth of said bulb, and said secondary capillary means is a measuring capillary closed at its upper end and having a lower end opening into the interior of said bulb, said measuring capillary increasing in diameter through its lower end toward the interior of said bulb.

11. The improvement set forth in claim 8 wherein said plunger means includes a bell-shaped shell open at its lower end and having first and second capillary means extending upwardly from said bell-shaped shell in its upper portion, said capillary means disposed substantially parallel to the sides of said container means, said capillary means opening into the interior of said shell at their lower ends, said shell being movable downwardly within said container means in such a manner that said open lower end of said shell and the body of said shell are insertable over a correspondingly-shaped portion of the lower end of said container means which protrudes upwardly into said container means, said downwardly moving shell displacing a volume of said primary liquid contained in said lower end of said container means in such a manner that said displaced volume of said primary liquid urges a volume of said secondary liquid contained in said container means into said capillary means at the upper portion of said plunger means.

12. The improvement set forth in claim 11 wherein said first capillary means is a reference capillary having a lower portion extending into the interior of said bell-shaped shell and directed substantially transversely to the central axis thereof, and said second capillary means is a measuring capillary closed at its upper end and having a lower end opening into the interior of said shell, said measuring capillary increasing in diameter through its lower end toward the interior of said shell.

13. The improvement set forth in claim 8 wherein said primary liquid contained in said container means is mercury and said secondary liquid contained in said container means is a liquid having a low density.

14. The apparatus of claim 8 wherein said plunger means is movable vertically within said container means by magnetically coupled means disposed near the upper portion of said plunger means on the interior and exterior of said container means.

15. In an apparatus particularly adapted for the precise measurement of pressures in vacuum systems, the combination comprising, container means closed and sealed at its opposite ends, said container means in communication at its upper end with a vacuum system through conduit means, said container means containing, at its lower end, a quantity of primary liquid disposed below a quantity of secondary liquid, plunger means surrounded and enclosed by said container means, said plunger means including a substantially spherical hollow bulb having an open downwardly extending cylindrical mouth at its lower portion and first and second capillary means extending upwardly from said hollow bulb in its upper portion, said capillary means disposed substantially parallel to the sides of said container means above said hollow bulb, said capillary means opening into the interior of said bulb at their lower ends, said bulb movable downwardly within said container means in such a manner that said cylindrical mouth of said bulb is insertable into a correspondingly-shaped downwardly protruding portion of said container means containing said primary liquid, a volume of which is displaced by said downwardly moving mouth of said bulb in such a manner that said displaced volume of said primary liquid urges a volume of said secondary liquid contained in said container means into said capillary means at the upper portion of said plunger means to permit measurement of the pressure in the vacuum system.

16. The combination set forth in claim 15 wherein said first capillary means is a reference capillary having a lower portion extending downwardly into the interior of said spherical bulb and generally directed toward said mouth of said bulb, and said second capillary means is a measuring capillary closed at its upper end and having a lower end opening into the interior of said bulb, said measuring capillary increasing in diameter through its lower end toward the interior of said bulb.

17. In an apparatus particularly adapted for the precise measurement of pressures in vacuum systems, the combination comprising, container means closed and sealed at its opposite ends, said container means in communication at its upper end with a vacuum system through conduit means, said container means containing, at its lower end, a quantity of primary liquid disposed below a quantity of secondary liquid, plunger means surrounded and enclosed by said container means, said plunger means including a bell-shaped shell open at its lower end and having first and second capillary means extending upwardly from said bell-shaped shell in its upper portion, said capillary means disposed substantially parallel to the sides of said container means above said shell, said first and second capillary means opening into the interior of said shell at their lower ends, said shell being movable downwardly within said container means in such a manner that said open lower end of said shell and the body of said shell are insertable over a correspondingly-shaped portion of the lower end of said container means which protrudes upwardly into said container means, said downwardly moving shell displacing a volume of said primary liquid contained in said lower end of said container means in such a manner that said displaced volume of said primary liquid urges a volume of said secondary liquid contained in said container means into said capillary means at the upper portion of said plunger means to permit measurement of the pressure in the vacuum system.

18. The combination set forth in claim 17 wherein said first capillary means is a reference capillary having a lower portion extending into the interior of said bell-shaped shell and directed substantially transversely to the central axis thereof, and said second capillary means is a measuring capillary closed at its upper end and having a lower end opening into the interior of said shell, said measuring capillary increasing in diameter through its lower end toward the interior of said shell.

* * * * *